Patented Feb. 12, 1924.

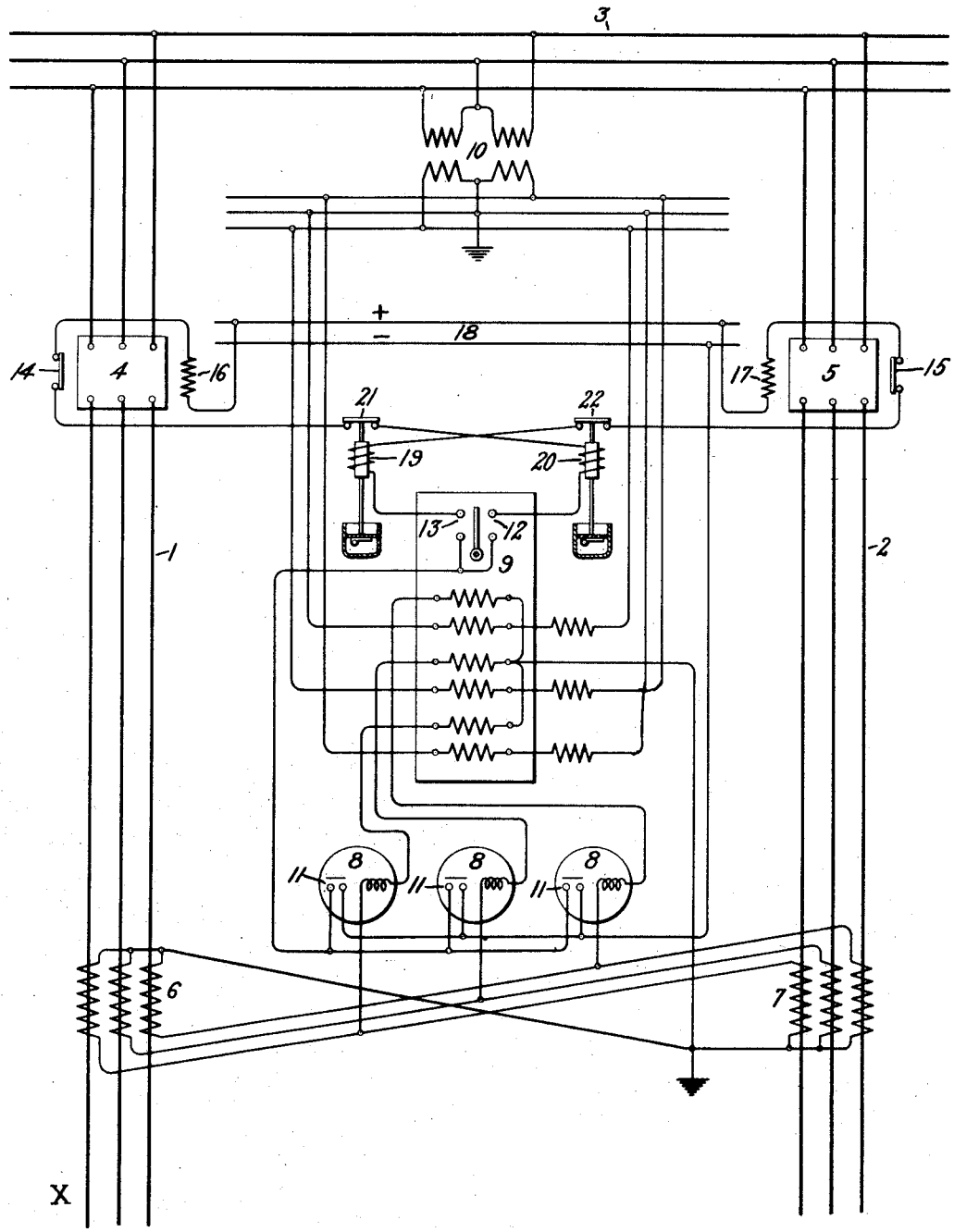

1,483,533

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTION OF TRANSMISSION LINES.

Application filed February 23, 1921. Serial No. 447,112.

*To all whom it may concern:*

Be it known that I, OLIVER C. TRAVER, a citizen of the United States, residing at Schenectady, in the county of Schenectady, State of New York, have invented certain new and useful Improvements in Protection of Transmission Lines, of which the following is a specification.

My invention relates to the protection of electrical transmission systems comprising transmission lines or feeders particularly those connected in parallel. In such systems, it is customary to provide protective devices for interrupting the circuit of each feeder at both ends. It frequently happens, however, upon the occurrence of a fault on one feeder, that the resulting fault currents cause the protective devices to respond and open the sound feeders before or immediately after opening the faulty feeder, thereby interrupting service on all feeders. To insure adequate protection and yet maintain continuity of service, the protective devices should operate selectively to allow the opening of the faulty feeder without interrupting the circuits of the sound feeders and yet provide protection for the sound feeders after isolating the faulty feeder.

The object of my invention is, therefore, to provide means for maintaining continuity of service on either one of a pair of transmission lines or feeders upon the occurrence of a fault on one line or feeder while selectively opening the line or feeder at fault and then acting to open the sound line or feeder upon the occurrence of a fault thereon.

My invention will be better understood from the following description taken in connection with the accompanying drawing and its scope will be pointed out in the appended claims.

The single figure of the accompanying drawing illustrates diagrammatically an embodiment of my invention as applied to the protection of two parallel feeders. In this figure, there is shown the generating or receiving end of a three-phase system, comprising two parallel feeders 1 and 2, connected to a station bus 3, through suitable switches 4 and 5 and provided with discriminating protective apparatus embodying my invention. It is understood that the other end of the feeders may be provided with similar protective apparatus.

Operatively related to each feeder are current transformers 6 and 7 whose secondaries are "cross-connected," as, for example, where the secondaries of each transformer are star-connected and a common conductor connects the neutral points, the secondaries corresponding to similar phases of each feeder being connected in series. Connected across normally equi-potential points of the circuits of the transformer secondaries are fault responsive means or selective control means for controlling the operation of the switches 4 and 5 and hence the circuits of the feeders 1 and 2, respectively. This selective control means may be of various forms, but what I prefer to use, is a control means across the secondaries of the current transformers 6 and 7. The selective control means comprises cooperating electroresponsive devices 8 and 9, the former being operative in response to fault currents in excess of a predetermined amount and the latter in response to the relative direction of flow of fault currents. The control device 8 may comprise three relays, one for each phase of the system, of the overload type connected in series with the corresponding current coils of the control device 9 which is of the reverse power relay type and which has its voltage coils operatively related to the secondaries of a potential transformer 10, whose primaries may be open delta-connected to the station bus 3. For the connection illustrated, the voltage coils of the control device 9 have resistors connected in series in their circuits and the secondaries of the current and potential transformers are preferably grounded.

The cooperating control devices 8 and 9 operate to close their respective contacts 11 and 12 or 13 either instantaneously or after a predetermined time thus completing the control circuit of the feeder switches 4 or 5.

The control circuits for the feeder switches 4 and 5 comprise auxiliary switches 14 and 15, cooperatively related thereto, trip coils 16 and 17 and the contacts 11 and 12 or 13 of the electroresponsive devices 8 and 9 in series. Consequently, before either control circuit can be closed, both the electroresponsive devices 8 and 9 of its controlling means must be in circuit closing position. The control circuits are operative from control buses 18.

Connected in the control circuits of the feeder switches 5 and 4 and adapted to operate upon the closing of either of these circuits, are circuit controlling or electroresponsive devices 19 and 20 of a type known in the art as instantaneous opening and time delay closing relays. Associated with the electroresponsive devices 19 and 20 in the control circuits of the feeder switches 4 and 5 are contact controlling members 21 and 22 normally in closed position. Each of the electroresponsive devices 19 and 20 and its cooperating contact controlling member are not in the same control circuit, that is to say, electroresponsive device 19 is in the control circuit of feeder switch 5 but its cooperating contact controlling member 21 is in the control circuit of feeder switch 4, and electroresponsive device 20 is in the control circuit of feeder switch 4 but its cooperating contact controlling member 22 is in the control circuit of feeder switch 5. Consequently upon the closing of either of the control circuits of the feeder switches 4 or 5 by the electroresponsive devices 8 and 9 in response to a fault on either feeder, one or the other of the electroresponsive devices 19 or 20 will operate substantially instantaneously to open its cooperating contact controlling member 21 or 22 in the other control circuit and to hold the same open for a predetermined time, thereby preventing the closing of the other control circuit long enough to permit conditions on the system to become normal.

The operation of my protective apparatus may be described as follows: Under the normal operating conditions with both feeders 1 and 2 in service, the contacts 11, 12 and 13 of the relay devices 8 and 9 are open and the contact controlling members 21 and 22 of relay devices 19 and 20 respectively, are in closed position. So long as the load currents in both feeders are the same, the currents set up in the cross-connected secondaries of the current transformers 6 and 7 are equal and no current will flow over the current coils of the electroresponsive devices 8 and 9.

It will first be assumed that bus 3 is one at a generating station and a fault occurs on feeder 1 at point X, for example. There is then an increased flow of current over feeder 1 and the resulting difference in the currents in the two feeders is reflected in the secondaries of the current transformers 6 and 7, the currents in the secondaries no longer being equal. Consequently current flows through the overload and reverse power relays 8 and 9 in a direction causing them to close their contacts 11 and 12, thus completing the control circuit of feeder switch 4 causing it to be opened. With the closing of the control circuit of feeder switch 4, relay device 20 is energized and operates substantially instantaneously to move its cooperating contact controlling member 22, which is in the control circuit of feeder switch 5, from closed to open position and to hold it in open position for a predetermined time, thus holding the control circuit of feeder switch 5 open until conditions on the system are normal. If the control circuit of feeder switch 5 were not thus held open and, as frequently happens, there should be a rush of curernt over feeder 2, following the opening of feeder switch 4, it would be reflected in the secondaries of current transformers 6 and 7, appearing as a current through relay devices 8 and 9 in a direction causing the closing of contacts 11 and 13 thus completing the control circuit of feeder switch 5 and tripping out the sound feeder, thereby interrupting service.

It will now be assumed that bus 3 is one at a receiving station and that there is a fault on feeder 1 as before. If the fault is a restricted one, the current flow over the sound feeder 2 is greater than the current flow over the faulty feeder and the unbalanced currents set up in the secondaries of the current transformers 6 and 7 cause a current in the relay devices 8 and 9 in a direction to close contacts 11 and 12 thereby tripping feeder switch 4. If the fault is a severe one there is apt to be a sudden rush of current over the sound feeder 2 and back on the faulty feeder 1 to the fault. In this case, the current in the electroresponsive devices 8 and 9 is the result of the arithmetic sum of the currents set up in the current transformer secondaries and in a direction causing the electroresponsive devices 8 and 9 to close contacts 11 and 12, thereby tripping feeder switch 4. In either case the control circuit of the faulty feeder is completed and the relay device 20 energized thereby causing it substantially instantaneously to move its cooperating contact controlling member 22 into open position where it is held a predetermined time thus preventing the tripping of feeder switch 5 until conditions on the system are normal.

At the end of the time delay action of relay device 20 its cooperating contact controlling member 22 is again in closed position and the electroresponsive devices 8 and 9 are operative to protect the sound feeder 2 against an overload providing the power flow is from bus to feeder, in which case current flows through the electroresponsive devices 8 and 9 in a direction causing them to close contacts 11 and 13 thus completing the control circuit of feeder switch 5.

In the event of a fault on feeder 2 instead of feeder 1, the operation of my protective apparatus would be similar to the operation heretofore described except that the control circuit of feeder switch 5 would be completed by the electroresponsive devices 8 and 9 thus energizing relay device 19 causing it to move its cooperating contact controlling member 21 substantially instantaneously to open position where it is held for a predetermined time to prevent closing the control circuit of feeder switch 4. Thus in case of a fault on either feeder, the feeder at fault is selected and its circuit interrupted, continuity of service being maintained on the sound feeder by preventing its feeder switch control circuit from being closed for a predetermined time. The time delay action of relay devices 21 and 22 is such that the protective apparatus at each end of the feeders has sufficient time to function and isolate the faulty feeder. This time delay action is particularly advantageous in the case of a fault on one feeder causing a rush of current over the sound feeder back on the faulty feeder to the fault. In this case, relay devices 8 and 9 tend to operate to complete the control circuit of the feeder switch in the sound feeder, as heretofore explained, but as one of the relay devices 19 or 20 is holding the trip circuit of the sound feeder open, the operation of relay devices 8 and 9 is ineffective to trip out the sound feeder.

Although I have shown and described my invention in considerable detail, I do not wish to be limited to the specific details thereof as shown and described, but may use such modifications, substitutions or equivalents thereof, as are embraced within the scope of my invention.

What I claim as new and desire to secure by Letters Patent of the United States, is:—

1. In combination with two transmission lines, means adapted to be operated to interrupt the circuits of said lines, control circuits for said interrupting means, means operative in response to abnormal conditions on either of said lines to complete the control circuit of the interrupting means in the line at fault, and electroresponsive means in circuit with said control circuits operative substantially instantaneously in response to the closing of the control circuit of the interrupting means in the line at fault to prevent the closing of the control circuit of the interrupting means in the sound line for a predetermined time.

2. A protective system for two transmission lines comprising means adapted to be operated to interrupt the circuits of said lines, control circuits for said interrupting means, means operative in response to abnormal conditions on either of said lines to complete the control circuit of the interrupting means in the line at fault, and electroresponsive means in circuit with said control circuits, operative in response to the closing of one of said control circuits to prevent the closing of the other control circuit for a predetermined time.

3. A protective system for two transmission lines comprising means adapted to be operated to interrupt the circuits of said lines, control circuits for said interrupting means, means operative in response to abnormal conditions on either of said lines to complete the control circuit of the interrupting means on the line at fault, circuit controlling members in said control circuits normally in closed position, and means in circuit with said control circuits operative in response to the closing of either of said control circuits to move the circuit controlling member in the other control circuit to open position and to hold the same in said open position for a predetermined time.

4. Fault responsive means for protecting a pair of parallel feeders, comprising means adapted to be operated to interrupt the circuits of said feeders, control circuits for said interrupting means, means responsive to the amount and direction of a difference in the loads on said feeders for selectively completing the control circuit of the interrupting means in the feeder at fault, and electroresponsive means in circuit with said control circuits operative substantially instantaneously in response to the closing of either of said control circuits to hold the other control circuit open for a predetermined time.

5. In combination with an electrical transmission system comprising two parallel feeders, means adapted to be operated to interrupt the circuits of said feeders, control circuits for said interrupting means, cooperating transformers operatively related to said feeders, electroresponsive means in circuit with the secondaries of said transformers operative in response to current in excess of a predetermined amount and in a predetermined direction selectively to close said control circuits, circuit controlling members in said control circuits normally in closed position, and means in said control circuits operative in response to the closing of either of said control circuits substantially instantaneously to move the circuit controlling member in the other control circuit to open position and hold it there a predetermined time.

6. In combination with two parallel feeders, means for protecting said feeders against faults thereon comprising means adapted to be operated to interrupt the circuits of said feeders, control circuits for said interrupting means, means responsive to the amount and direction of a difference in the loads on said feeders for selectively closing the control circuit of the interrupting means in the feeder at fault, circuit controlling members in said control circuits normally in closed position, and electroresponsive devices in said control circuits operative in response to the closing of either of said control circuits to move the circuit controlling member in the other control circuit to open position and hold the same in said open position for a predetermined time.

7. In combination with two parallel feeders, means adapted to be operated to interrupt the circuits of said feeders, control circuits for said interrupting means, means operative in response to the direction and amount of a current which is a measure of the current unbalancing caused in said feeders upon the occurrence of a fault on either feeder selectively to complete the control circuit of the interrupting means in the feeder at fault, contact controlling members in said control circuits normally in closed position, means in each control circuit arranged to control said contact controlling members, said means being operative in response to the closing of either of said control circuits to move the contact controlling member in the other control circuit to open position and hold the same in said open position for a predetermined time.

8. In combination with two parallel feeders, means adapted to be operated to interrupt the circuits of said feeders, control circuits for said interrupting means, means operative in response to the direction and amount of a current which is a measure of the current unbalancing caused in said feeders upon the occurrence of a fault on either feeder selectively to complete the control circuit of the interrupting means in the feeder at fault, and electroresponsive means in circuit with said control circuits operative substantially instantaneously in response to the closing of the control circuit of the interrupting means in the feeder at fault to prevent the closing of the control circuit of the interrupting means in the sound feeder for a predetermined time.

9. In combination with two parallel feeders, means adapted to be operated to interrupt the circuits of said feeders, control circuits for said interrupting means, means operative in response to the direction and amount of a current which is a measure of the current unbalancing caused in said feeders upon the occurrence of a fault on either feeder selectively to complete the control circuit of the interrupting means in the feeder at fault, characterized by the fact that each of said control circuits is provided with an electroresponsive means in circuit therewith and a contact controlling member normally in closed position, the electroresponsive means of either control circuit being arranged to control the contact controlling member in the other control circuit, whereby upon the closing of either of said control circuits the electroresponsive means of that circuit operates to move the contact controlling member of the other control circuit to open position and to hold the same in said open position for a predetermined time.

In witness whereof I have hereunto set my hand this 21st day of February, 1921.

OLIVER C. TRAVER.